US007013273B2

(12) United States Patent
Kahn (10) Patent No.: US 7,013,273 B2
(45) Date of Patent: Mar. 14, 2006

(54) SPEECH RECOGNITION BASED CAPTIONING SYSTEM

(75) Inventor: Michael Kahn, Westampton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 536 days.

(21) Appl. No.: 09/820,401

(22) Filed: Mar. 29, 2001

(65) Prior Publication Data

US 2002/0143531 A1    Oct. 3, 2002

(51) Int. Cl.
G01L 15/26    (2006.01)
G01L 15/06    (2006.01)
G01L 15/14    (2006.01)

(52) U.S. Cl. ............... 704/235; 704/244; 704/256; 348/468

(58) Field of Classification Search ............... 704/235, 704/231, 251, 256, 244; 348/468
See application file for complete search history.

(56) References Cited

U.S. PATENT DOCUMENTS

| 5,512,938 A | 4/1996 | Ohno |
| 5,621,859 A | 4/1997 | Schwartz et al. |
| 5,799,276 A | 8/1998 | Komissarchik et al. |
| 5,815,196 A | 9/1998 | Alshawi |
| 5,822,728 A | 10/1998 | Applebaum et al. |
| 5,839,101 A | 11/1998 | Vahatalo et al. |
| 5,893,059 A | 4/1999 | Raman |
| 5,974,373 A | 10/1999 | Chan et al. |
| 5,995,155 A * | 11/1999 | Schindler et al. ........... 348/461 |
| 6,092,045 A | 7/2000 | Stubley et al. |
| 6,172,675 B1 * | 1/2001 | Ahmad et al. ........... 715/500.1 |
| 6,332,122 B1 * | 12/2001 | Ortega et al. ............... 704/270 |
| 6,415,256 B1 * | 7/2002 | Ditzik ........................ 704/231 |
| 6,480,819 B1 * | 11/2002 | Boman et al. ................. 704/9 |
| 6,505,153 B1 * | 1/2003 | Van Thong et al. ......... 704/211 |
| 2001/0025241 A1 | 9/2001 | Lange et al. |

FOREIGN PATENT DOCUMENTS

| EP | 0 241 683 | 10/1987 |
| EP | 0 905 679 | 3/1999 |
| WO | WO 01/18665 | 3/2001 |

OTHER PUBLICATIONS

"An Automatic Caption-Superimposing System with a New Continuous Speech Recognizer," Imai, T.; Ando, A.; Miyasaka, E.; Broadcasting, IEEE Transactions on , vol.: 40 Issue: 3 , Sep. 1994 Page(s): 184-189.*

(Continued)

*Primary Examiner*—W. R. Young
*Assistant Examiner*—James S. Wozniak
(74) *Attorney, Agent, or Firm*—RatnerPrestia (57) ABSTRACT

A system and associated method of converting audio data from a television signal into textual data for display as a closed caption on an display device is provided. The audio data is decoded and audio speech signals are filtered from the audio data. The audio speech signals are parsed into phonemes in accordance by a speech recognition module. The parsed phonemes are grouped into words and sentences responsive to a database of words corresponding to the grouped phonemes. The words are converted into text data which is formatted for presentation on the display device as closed captioned textual data.

14 Claims, 5 Drawing Sheets

OTHER PUBLICATIONS

"Improving Acoustic Models with Captioned Multimedia Speech," Photina Jaeyun Jang; Hauptmann, A.G.; Multimedia Computing and Systems, 1999. IEEE International Conference on , vol.: 2 , Jun. 7-11, 1999, Page(s): 767-771 vol. 2.*

"Suppression of acoustic noise in speech using spectral substraction;" Boll, Acoustics, Speech, and Signal Processing, IEEE Transactions on , vol.: 27 , Issue: 2 , Apr 1979; pp.: 113-120.*

Hauptmann, A.G., and Smith, M., "Text, Speech and Vision for Video Segmentation: The Informedia Project." AAAI Fall Symposium, Computational Models for Integrating Language and Vision, Boston, Nov. 10-12, 1995.*

European Search Report, Dec. 30, 2002.

M. Ostendorf, "Moving Beyond The 'Beads-On-A-String' Model of Speech", Department of Electrical Engineering, University of Washington, Seattle, WA 98195, no date.

R. Schwartz et al., "Accurate Near-Real-Time Recognition of Broadcast News using Multiple-Pass Search Techniques", BBN Technologies (GTE), Cambridge, MA 02138, no date.

W. Jiang et al., "Adaptive Noise Reduction of Speech Signals", Microsoft Research, Jul. 2000, no day.

P.C. Woodland, "Speaker Adaptation: Techniques and Challenges", Cambridge University Engineering Department, no date.

* cited by examiner

FIG. 4 t  |Today's weather will be partly cloudy, with a|  ~ Line 1 t+1  |Today's weather will be partly cloudy, with a chance of rain in the evening. The high|  ~ Line 1 + Line 2 t+2  |chance of rain in the evening. The high temperature will be in the mid seventies.|  ~ Line 2 + Line 3

FIG. 5

SPEECH RECOGNITION BASED CAPTIONING SYSTEM

The present invention relates, in general, to a method of providing speech captioning. More particularly, this invention provides a method for converting audio speech signals to text for use as closed-captioning through the use of a speech recognition system.

BACKGROUND OF THE INVENTION

Closed-captioning has been widely implemented in television broadcast systems for terrestrial and satellite broadcast. The purpose of closed captioning is to provide visible textual data in the place of auditory data. The visual data is then made available for use by the hearing impaired audience to read in place of the available audio. Current closed captioning systems provide embedded textual data prior to the transmission of the audio and video data. The textual data is then processed by a display device and the textual data is displayed in a desired format on a video screen.

Thus, prior to transmission or viewing, captioning data is presently embedded into the broadcast transmission stream at the broadcast source. Not all programs, however, are readily adaptable to this technique of embedding closed caption information. For example, it is difficult to add closed caption data to live events or to programs filmed prior to the advent of closed-captioning technology. As such, a hearing impaired viewer may not be able to view text to aid in understanding of such programs.

General purpose, speaker dependent (SD) speech recognition products are increasingly utilized to perform such tasks as, telephone based menu systems/controls and the like. These systems typically employ a Dynamic Time Warping (DTW) model. However, as the DTW model is designed to recognize entire words, as opposed to sub-components of words, thus its usefulness is limited to systems with small vocabularies. Alternatively, Hidden Markov Model (HMM) based speech recognition systems may be employed where larger vocabularies are needed as HMM systems examine word sub-components or "phonemes."

Both the DTW and HMM systems work best when the speech recognition system is "trained" to identify the unique traits of each speaker. This training includes the creation of templates or data sets, which identify unique speech characteristics of the speaker utilizing the system to aid in the recognition of their speech. Typically, a speaker provides a set of known spoken words to the system for use in training the system. The spoken words are converted into digital data, and then a template or model of the speech is generated, the template or model includes information about various characteristics of the speech. The templates or models generated are stored in a database for use during speech recognition. Thus, input audio speech signals are processed in the same manner as the audio speech signals, which created the templates or models. The signal characteristics or data generated by the process is then compared to the templates or models. The best match between the input audio speech signals and the template or model is determined in an attempt to identify words of the audio speech signal.

As can be appreciated, pure knowledge based or "speaker independent" (SI) speech recognition system which would not require such training has increasingly become the basis for modern speech recognition applications and systems. Speaker independent systems may operate in many ways. Some SI systems employ HMMs to directly recognize whole words. These systems, however, tend to have limited vocabularies. Other types of SI systems employ robust HMMs that are trained on a number of different speakers. These systems are similar to the SD systems as they parse the audio signals into phonemes.

SUMMARY OF THE INVENTION

The present invention is embodied in a method for converting audio speech signals to textual data and displaying the resulting textual data as captioning on an video display device. The audio data of the audio-visual device is decoded and audio speech signals are filtered. The audio speech signals are parsed into phonemes in accordance with a first instruction set of the speech recognition module. The parsed phonemes are grouped into words and sentences by the first instruction set. Words are identified in a database corresponding to the grouped phonemes and the identified words are converted into text data for presentation on the display of the audio-visual device as closed captioned textual data.

In a further aspect of the invention, audio data is converted to text data for display as a caption on an audio-visual device. At least one training segment of an audio speech signal is recovered and stored in a memory. The at least one training segment corresponds to the speech traits of at least one source of the audio speech signals. The audio speech signals are then parsed into phonemes in accordance with a first instruction set of the speech recognition module. The parsed phonemes are grouped into words and sentences by the first instruction set. The first instruction set utilizes the at least one training segment to adjust the parsing relative to stored speech traits. Words are identified in a database corresponding to the grouped phonemes and the identified words are converted into text data for presentation on the display of the audio-visual device as closed captioned textual data.

It is to be understood that both the foregoing general description of the invention and the following detailed description are exemplary, but are not restrictive, of the invention.

BRIEF DESCRIPTION OF THE DRAWING

The invention is best understood from the following detailed description when read in conjunction with the accompanying drawings.

DETAILED DESCRIPTION OF THE INVENTION

Certain terminology used in the following description is for convenience only and is not limiting. The term "phoneme" is generally defined as a delineated portion of a spoken utterance, the delineation being defined and grouped in accordance with a phonological and phonetic/acoustic rule instruction set of a speech recognition system. The English language is generally considered to have 44 distinct phonemes.

The present invention provides a speech recognition module (SRM) for an audio-visual device, such as a digital set top box, to dynamically enable a textual account of a program in the case where no closed captioning information has been previously embedded in the audio-visual signal. An exemplary speech recognition module according to the present invention may operate in a speech independent mode (SI), a speech dependent mode (SD) or a combination of both.

Hardware

Figure 1:
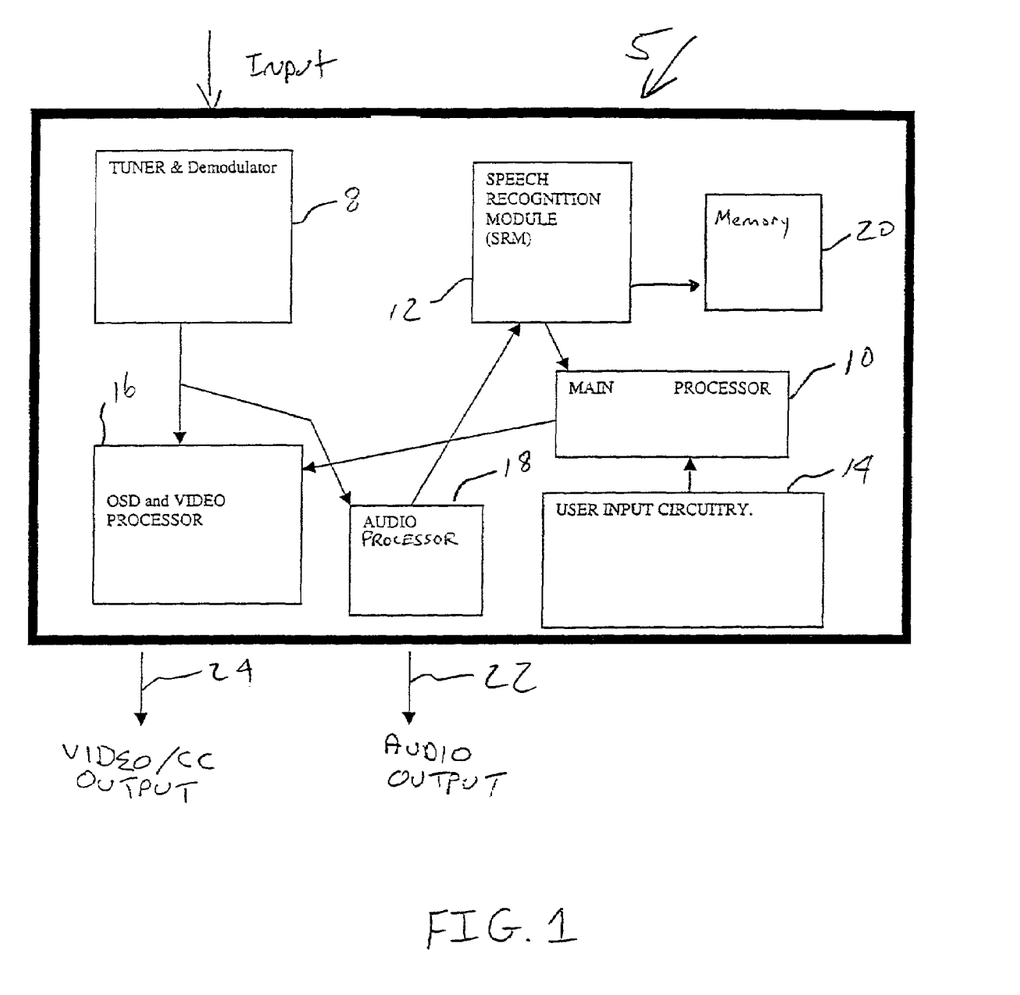
FIG. 1 is a is a high level block diagram of an integrated receiver decoder (IRD) that receives television signals and provides audio and video information for presentation to a viewer.

Referring now more specifically to the drawings, FIG. 1 shows a high-level block diagram of a basic digital television IRD (Integrated Receiver and Decoder) 5 which recovers and processes television signals. The IRD 5 includes a tuner and demodulator module 8, a main data processor 10, speech recognition module 12, user interface 14, on screen display (OSD) and video processor 16, and audio decoder 18, and memory 22. Digital or analog audio-visual data flow is represented by the arrow from tuner and demodulator module 8, to OSD and video processor module 16.

The exemplary IRD 5 receives and processes both analog and digital television signals. The digital television signals may, for example be encoded according to the standard specified by the Advanced Television Systems Committee (ATSC). The exemplary system decodes the digital bitstream to present decoded audio and video output signals at respective output ports, 22 and 24 of the IRD, respectively. Typically, the IRD 5 receives and demodulates digital television signals to recover the audio, video and data bitstreams for a particular program. The IRD then performs real time audio and video decompression of various data streams (bitstreams) to recover the audio and video data as well as auxiliary data, such as closed captioning information, sent in the data bit stream for the program. An exemplary ATSC decoder is described in U.S. Pat. No. 6,175,592 entitled FREQUENCY DOMAIN FILTERING FOR DOWN CONVERSION OF A DCT ENCODED PICTURE. The exemplary IRD 5 may also include a conventional analog television decoder, for example, an NTSC decoder, which demodulates and decodes analog television signals to provide analog audio and video output signals.

The tuner and demodulator module 8 receives and demodulates the television signals that include the transmitted digital television bitstreams or analog television signals. If a digital television signal is being received, the tuner and demodulator 8 may also separate the transport packets relating to a desired television program and decode the transport packets to provide either elementary stream (ES) or packetized elementary stream (PES) packets or fully decoded audio, video and data bit-streams to the audio processor 18 and the OSD and video processor 16. If the tuner and demodulator 8 is processing an analog television signal, it separates the audio and video components and provides the audio components to the audio processor 18 and the video components to the OSD and video processor 16.

The main data processor 10 performs a plurality of control functions in accordance with control parameters of the control stream. Specifically, the main data processor 10 provides control data to the OSD and video processor 16, manages access to memory 20, and controls the display of decoded images of the data stream. The main data processor 10 may, for example, determine, responsive to a viewer selection, which television program is to be received, decoded and displayed. Using this information the processor 10 controls the tuner and demodulator 8 to tune to the channel that contains the desired program, demodulate a baseband analog signal, when the channel contains an analog television signal; or demodulate transport packets of a digital television signal and separate the audio, video and data transport packets for this program from the decoded packet data for the channel. The main data processor 10 may also control the OSD and video processor 16 to adjust the brightness and color balance of the displayed image and to display predetermined text, for example, closed caption data or an operational menu to the viewer using the OSD function of the processor.

In an exemplary embodiment, user interface 14 includes infrared inputs for receiving data from a remote control device (not shown) and circuitry for receiving manual input of data from a control panel (not shown) of the audio-visual device. In response to the viewer using the controls on the control panel, this circuitry may, for example, send a message to the main data processor 10, signaling it to display a control menu and then interpret further commands from the viewer as being related to the displayed menu. For example, the menu may be utilized to enable speech recognition module 12 to convert audio speech signals to closed-captioned text for display on the audio-visual device. Similarly, the menu may be utilized to select a desired language, dialect or text font.

The memory 20 may be, for example, a random access memory which stores the OSD bit map and, for digital programs, the compressed data and one or more decoded images. In an exemplary embodiment, the memory 20 may also store SRM data, such as preset hidden Markov models for various languages or dialects or SRM training segments which are to be used for training based SRM embodiments (described below). The memory 20 may be partitioned into a plurality of buffers. A bitstream buffer that stores compressed data, an OSD buffer that stores the OSD bit map (i.e., menu functions, closed caption data and channel logos transmitted from audio visual devices and cable systems), and frame buffers that store frames of decoded video images. In this way, OSD and video processor 16 decodes the compressed data in memory 20 and reconstructs the image data for storage in the appropriate buffer. Where the received signal is a digital television signal, the transmitted, compressed data may represent only information that has changed relative to a previously transmitted image. The resulting image is reconstructed by decompressing this residual data and adding it to a stored reference image.

The OSD information is displayed by overlaying the OSD bit-map onto the image that is being displayed. As known to those in the art, a mixer (not shown) serves to selectively blend image data with OSD pixel data (i.e., closed captioning). The mixer displays each pixel at a location, an OSD pixel, a pixel of an image, or a combination thereof. The output of the mixer is an analog video signal that is provided to the display device (not shown) which in turn, is connected to the IRD 5.

An audio decoder 18 processes the digital or analog audio data provided by the tuner and demodulator 8. When analog audio information is received, the audio processor may include an analog-to-digital converter (ADC) that digitizes the audio data. The decoded audio data is passed to the audio decoder 18, to the SRM 12, and the audio output 22 simultaneously. The SRM 12 converts the audio speech signal portions to text, and sends this text to the main data processor 10. The main data processor 10 sends this data to OSD and video processor 16. The OSD and video processor 16 extracts the closed caption text, either from the vertical blanking interval of analog video signals or from the data program of a digital television program, and inserts the closed caption text into the video output signal. This closed-captioned text will then appear on a television monitor operably linked to video output 25. The detailed operation of SRM 12 is described below with reference to FIGS. 2–5 herein.

SRM Processing

Figure 2:
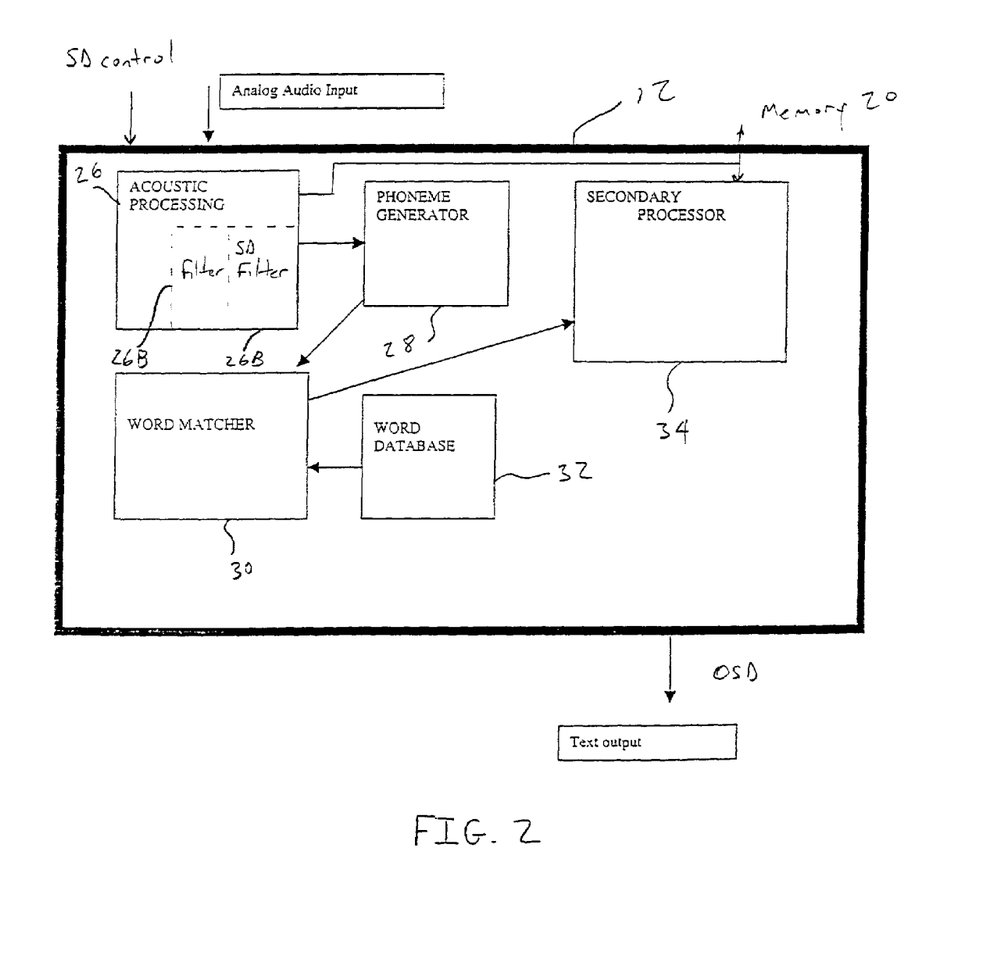
FIG. 2 is a high level block diagram of the speech recognition module (SRM)

FIG. 2 shows an exemplary SRM 12 suitable for use with the present invention. The SRM 12 as described above is integrated into a digital television set top box 5. The SRM 12 is responsive to the input audio-visual signal to dynamically convert the audio data into captioned text for display by the video display device. This text is displayed on the screen in typical fashion as closed caption information.

A summary of the operation of SRM 12 is a s follows:

The digitized audio data enters the SRM 12 at an input thereof, the audio data is provided to the acoustic processor 26. The acoustic processor 26 performs signal filtering to identify audio segments including speech components and separate the speech segments from the audio input. The speech signals are then sent to the phoneme generator 28. The phoneme generator 28 processes the speech signals through filters to identify various components which are applied to hidden Markov models that convert the audio input into "phonemes" or speech parts. The phonemes are sent to the word matcher 30, which selects a matching word from a word database 32 based on the identified phonemes of each word. The selected database word is then output from the SRM 12 as a text character signal for processing by the OSD and video processor 16 for display on a video screen of the audio visual device as text data. The word database 32 may also include a context module that distinguishes between homophones such as "to," "too" and "two." An exemplary SRM suitable for use with the present invention is described in U.S. Pat. No. 5,822,728 entitled MULTISTAGE WORD RECOGNIZER BASED ON RELIABLY DETECTED PHONEME SIMILARITY REGIONS.

More specifically, as shown in FIG. 2, the exemplary SRM 12 receives a digital audio input from audio decoder 18 of set top box 5. In an exemplary embodiment, the audio input data may be separated into separate audio channels for each known source of audio speech data. For example, in the case of a live broadcast of a sporting event, the play-by-play and color commentator may be transmitted on separate channels so that the SRM 12 would not be confused by simultaneous speech. SRM 12 includes a secondary data processor 34, an acoustic processor 26, a phoneme generator 28, a word matcher 30 and a word database 32.

The acoustic processor 26 includes filtering module 26A and speech dependent segment filter 26B. The filtering module 26A performs audio data signal filtering to separate the speech signals from other audio data such as superimposed music and other background noise. In an exemplary embodiment, the filtering module 26A utilizes a spectral subtraction method. The secondary processor 34 identifies and extracts the speech signals. This filter may, for example, use a Fast Fourier Transform (FFT) operation to decompose the speech signals into various frequency components. The frequency domain representation of the voice signals may be used, for example, to selectively suppress noise components for each frequency range or to selectively eliminate segments, such as very low tones or long tones, that are unlikely to include meaningful speech information. Alternatively, filtering module 26A may employ filter banks for separating and attenuating noise from frequency components. Those skilled in the art recognize however, that any number of known filtering techniques can be employed for recognizing and separating speech signals audio data.

Speech dependent (SD) signal filter 26B is provided for analyzing and classifying speech segments received from the acoustic processor 26. This filter may, for example, analyze the frequency-domain representation of the speech signals to classify speech intervals as voiced or unvoiced consonant sounds or vowel sounds. In an exemplary embodiment, the SD filter 26B may also be used to analyze and classify training segments that are periodically embedded into the audio data for use by the SRM 12. For example, prior to the broadcast of a live event, each speaker may generate an SD template for broadcast prior to the event to facilitate speech recognition in accordance with the present invention (the generation of this template may, for example, consist of simply providing text data for a limited amount of scripted information that the speaker normally reads during the broadcast). The training segments or SD templates are identified by audio decoder 18 by way of transmission indicia such as header information, including a time stamp, occurring before the text in the data program. The header information, for example, may identify the text data as corresponding to audio data, transmitted in the audio program and having the same time stamp. The header information may also indicate a particular language or dialect as well as a channel designation corresponding to a specific channel of audio speech data. The training segments are passed to speech dependent signal filter 26B to be processed into speech characteristics that are then combined with the training data to produce a hidden Markov model that is used by the phoneme generator 28, as described below. In an exemplary embodiment, the SD mode can be used as the sole recognition mode, or, be used in conjunction with the SI mode of the SRM 12. The training segment may be stored in memory 20 for use by SRM 12, the training segment corresponds to the speech traits of at least one source of the audio speech signals. In an exemplary embodiment, SD template data of memory 20 may be utilized when the SD mode is enabled to build or modify the hidden Markov model used by the SRM. Alternatively, the digital television signal may include a hidden Markov model or modifications to a default hidden Markov model that aid speech recognition for a particular program. This information may be in the data program or embedded as user data in the audio or video programs.

The phoneme generator 28 receives the analyzed speech signals from the SD filter 26B as well as an indication of which hidden Markov model is to be used to extract phonemes from these speech signals. Where no language or dialect designation is available, device 5 uses a default language designation or the designation set by a user through user interface 14. In one exemplary embodiment of the invention, the system may include multiple hidden Markov models and the viewer may be able to cycle through these models to select the one that provides the best results for a given audio program. The phoneme generator 28 defines and parses the audio speech portions parts into speech parts, known as phonemes. In operation, the phoneme generator segments the incoming audio speech signal based on silence intervals and location of specific spoken utterances in relation to others. In an exemplary embodiment, a forward-backward scan may be utilized to process streams of incoming audio speech signals to make a fast initial forward pass to identify phonemes, the backward pass being more computation intensive for identifying phonemes not adequately identified in the forward scan. The scan process, such as the Viterbi process enables the location and identification of phonemes by way of a corresponding instruction set of secondary data processor 34 for identifying words in word matcher 30 and word database 32. Where the SD mode has been enabled, a third scan may be performed to compare audio speech data to the stored training segment in order to generate or modify the hidden Markov model that is used by the phoneme generator.

The secondary data processor 34 operates in parallel with the acoustic processor 26 and phoneme generator 28. The secondary data processor 34 controls the work matcher 30 to generate words that correspond to the stream of phonemes provided by the phoneme generator 28. The processor 34 also formats these words for display as closed caption information and modifies the closed caption portion of the memory 20 accordingly. The data processor 34 also controls the components of the SRM 5, and provides I/O with other modules of the audio/visual device. For example, all accesses requests to memory 20 are made through the secondary data processor 34.

The word matcher 30 converts the generated phoneme into words by looking up a corresponding word containing the phonemes stored in the word database 32. The word database 32 contains lists of words for a particular language or a selected one of a plurality of stored languages. The word database 32 may also include context information to aid in distinguishing homophones.

Closed Caption Enablement

The SRM 12 is selectively engaged, to utilize embedded closed-captioned data of the audio signal when available, and use the speech recognition function only when the closed captioning data is not available. An exemplary control flow is shown in FIG. 3 for selectively engaging SRM 12.

Figure 3:
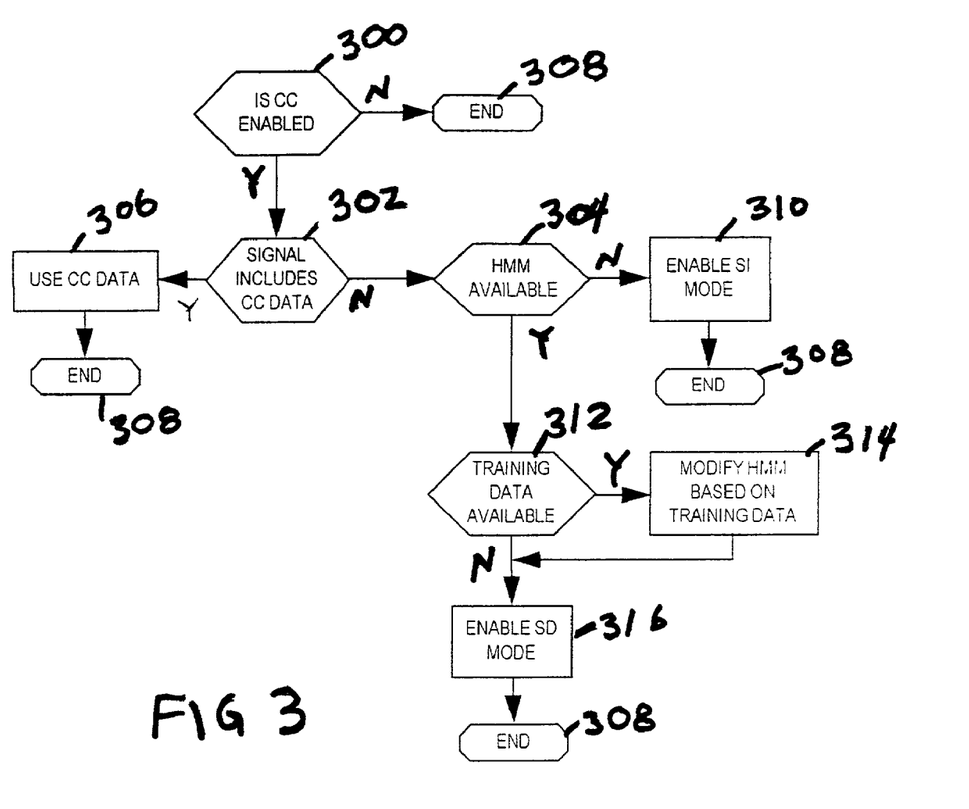
FIG. 3 is a flow diagram which describes the selection of a type of closed captioning.

As shown in FIG. 3, at step 300, the main data processor 10 of IRD 5 determines whether the closed captioning display option of the audio-visual device has been enabled. If the option has not been enabled, the process terminates at step 308. The viewer may enable the closed captioning display option, for example, from a conventional control menu. If the closed captioning option is enabled, the process moves to step 302, which determines if the television signal includes closed caption data. As described above, for analog television signals, closed caption data may be encoded in the vertical blanking interval of the video signal and for digital television signals, it may be transmitted in the data program portion of the television program. If, at step 302, it is determined that the television signal includes closed caption information, then, at step 306, the processor 10 enables the system to use the embedded closed captioning data. If, at step 302, no closed caption data is included in the television signal then, the SRM is used to derive closed caption information from the audio signal, at step 304 the processor 10 determines if speaker dependent hidden Markov model (HMM) data is available. If no HMM data is available, at step 310, the processor 10 enables the speaker independent (SI) mode of the SRM 12 and terminates the process at step 308. If, however, at step 304, the processor 10 determines that HMM data is available, then, at step 312, it determines if training data is available. When training data is available, the processor 10 controls the SRM 12, at step 314, to use the training data to generate or modify the HMM. After updating the HMM or, after step 312 if no training data is available, the processor 10 enables the speaker dependent (SD) mode for the SRM 12 at step 316 and terminates the selection process at step 308.

Conventional closed captioning data embedded within an audio-visual signal also includes formatting information for the OSD and video processor 16. This formatting data provides details of where to place each character on the screen of the audio-visual device and when to scroll a new line of data onto the screen. With the voice recognition based closed captioning system in accordance with the present invention, however, the formatting is generated by the secondary data processor 34 as shown in the flow chart of FIG. 4.

Figure 4:
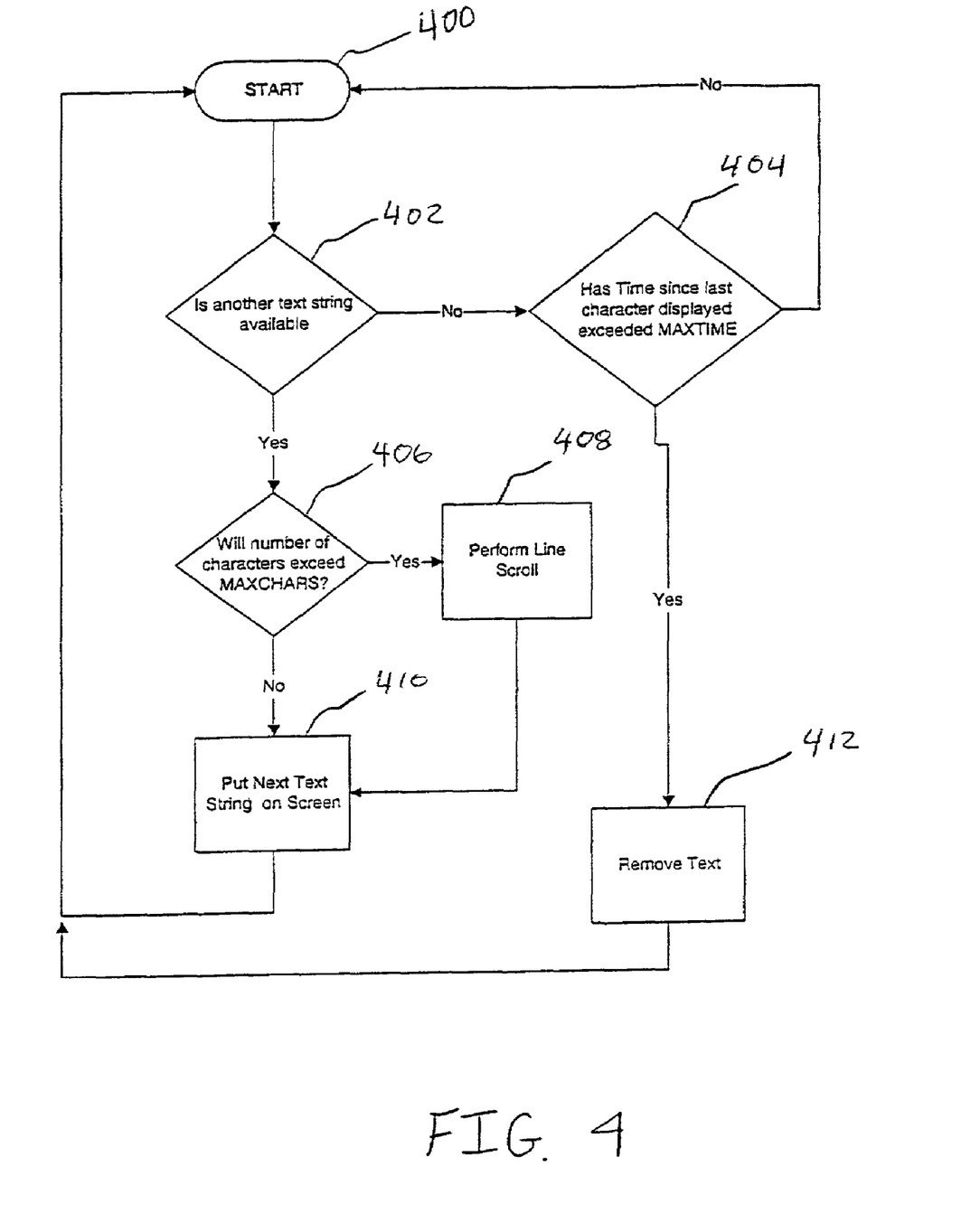
FIG. 4 is a flow diagram of a method for displaying closed caption text derived by an SRM according to the present invention.

The formatting instruction or third instruction set enables basic functionality to provide a two-line display, for example, at a bottom portion of an image signal as it is displayed on an audio-visual monitor viewing area. As shown in FIG. 4, the process begins at step 400. At step 402, the processor 34 determines whether another text string is available for display, if another string is available, at step 406 the length of the text strings is determined. Where no further text string is available, at step 404, the process determines whether a maximum amount of time (e.g. one minute) has passed since the last character was displayed. If the maximum time has not passed, the process returns to step 400. If the maximum time has passed, the text is removed from the display at step 412 and the process returns to step 400. In step 406, when the number of characters of the next string exceeds the maximum threshold MAXCHARS, at step 408 the current line on the display is scrolled, and at step 410 the next text string is displayed in the newly created area. Where the next text string does not exceed MAXCHARS in step 404, the process continues to step 410 and places the next text string on the available display space for the current line. The process then returns to step 400. Thus, the process shown in FIG. 4 executes periodically to determine what action (if any) needs to be taken. If the number of characters in the new closed captioned text string exceeds a predetermined threshold, the current line being displayed is "scrolled" upward to allow room for a new line of closed captioned data. It is recognized by those skilled in the art that the direction of the scrolling (i.e., upward or downward) is a matter of design choice. An exemplary scrolling process is shown in FIG. 5.

Figure 5:
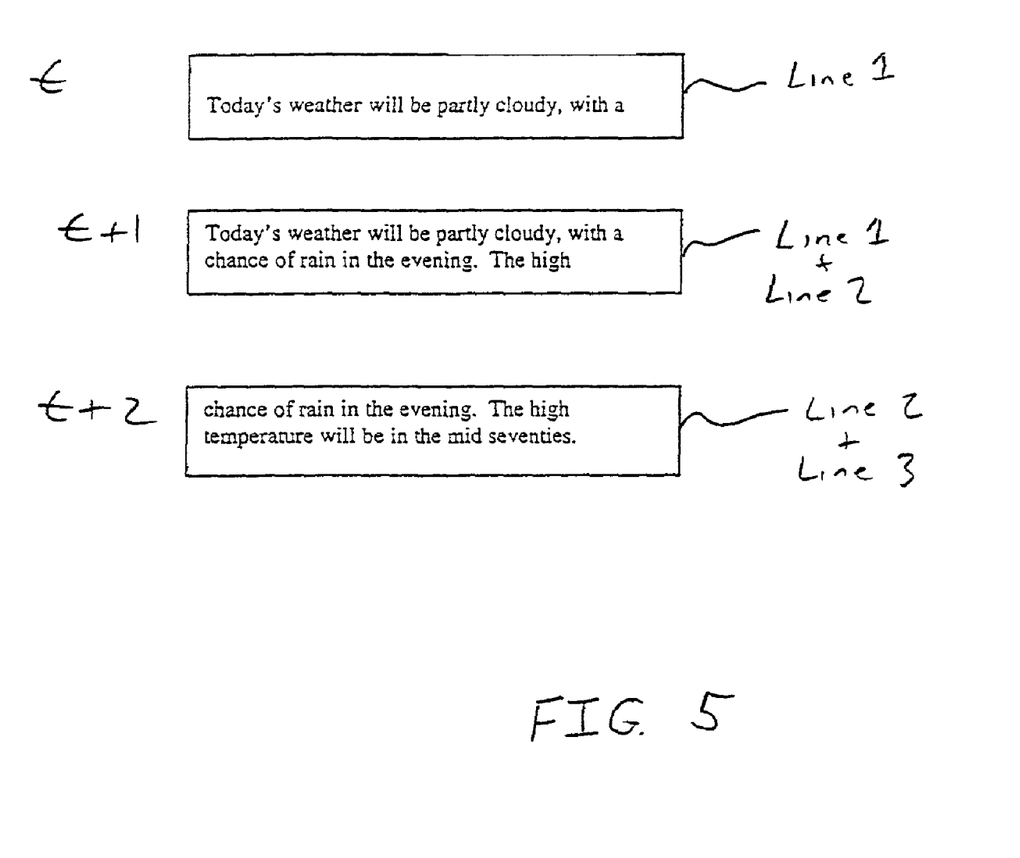
FIG. 5 is an example of a closed-captioned text display in accordance with the present invention.

FIG. 5 shows the process for displaying three text string lines, 1–3. At time t, line 1 is displayed along a portion of a display device. At time t+1, line 1 and line 2 are displayed, all of the available space in the closed caption area is utilized to display line 1 and line 2. At time t+2 line 1 is removed from the display, line 2 is scrolled upward, and line 3 is placed at the bottom of the closed caption display area.

While the exemplary system is described in terms of a combination of a hardware and software implementation, it is contemplated that it may be practiced entirely in software running on a computer. This software may be embodied in a carrier such as an integrated circuit, memory card, magnetic or optical disk or an optical, audio-frequency or radio frequency carrier wave.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method of displaying text information corresponding to a speech portion of audio signals of television program signals as a closed caption an a video display device, the method comprising the steps of:

decoding the audio signals of the television program;

filtering the audio signals by using a spectral subtraction method to extract the speech portion;

parsing the speech portion into discrete speech components in accordance with a speech model and grouping the parsed speech components employing a speaker dependent model to provide phonemes as the parsed speech components wherein the speaker dependent model employs a hidden Markov model;

receiving a training text as a part of the television signal, the training text corresponding to a part of the speech portion of the audio signals;

updating the hidden Markov model based on the training text and the part of the speech portion of the audio signals corresponding to the training text;

applying the updated hidden Markov model to parse the speech portion of the audio signals to provide the phonemes;

identifying words in a database corresponding to the grouped speech components; and     converting the identified words into text data for display on the display device as the closed caption.

2. A method according to claim 1, wherein the step of filtering the audio signals is performed concurrently with the step of decoding of later-occurring audio signals of the television program and step of parsing of earlier occurring speech signals of the television program.

3. A method according to claim 1, wherein the step of parsing the speech portion into discrete speech components includes the step of employing a speaker independent model to provide individual words as the parsed speech components.

4. A method according to claim 1 further including the step of formatting the text data into lines of text data for display in a closed caption area of the display device.

5. A method of displaying text information corresponding to a speech portion of audio signals of a television program as a closed caption on an video display device, the method comprising the steps of:

decoding the audio signals of the television program;

filtering the audio signals by using a spectral subtraction method to extract the speech portion;

receiving a training text as a part of the television signal, the training text corresponding to a part of the speech portion of the audio signals;

generating a hidden Markov model from the training text and the part of the speech portion of the audio signals;

parsing the audio speech signals into phonemes based on the generated Hidden Markov model;

identifying words in a database corresponding to grouped phonemes; and     converting the identified words into text data for presentation on the display of the audio-visual device as closed captioned textual data.

6. A method according to claim 5, wherein the step of filtering the audio signals is performed concurrently with the step of decoding of later-occurring audio signals of the television program and step of parsing of earlier occurring speech signals of the television program.

7. A method according to claim 5 further including the step of formatting the text data into lines of text data for display in a closed caption area of the display device.

8. A method according to claim 5, further comprising the step of providing respective audio speech signals and training texts for each speaker of a plurality of speakers on the television program.

9. Apparatus for displaying text information corresponding to a speech portion of audio signals of television program signals as a closed caption on an video display device, the apparatus comprising:

a decoder which separates the audio signals from the television program signals;

a spectral subtraction speech filter which identifies portions of the audio signals that include speech components and separates the identified speech component signals from the audio signals;

a phoneme generator including a speaker-dependent speech recognition system which parses the speech portion into phonemes in accordance with a speech model which include s a hidden Markov model, the phoneme generator including:

means for receiving a training text as a part of the television signal, the training text corresponding to a part of the speech portion of the audio signals;

means for adapting the hidden Markov model based on the training text and the part of the speech portion of the audio signals corresponding to the training text; and         means for applying the updated hidden Markov model to parse the speech portion of the audio signals to provide the phonemes;

a database of words, each word being identified as corresponding to a discrete set of phonemes;

a word matcher which groups the phonemes provided by the phoneme generator and identifies words In the database corresponding to the grouped phonemes; and     a formatting processor that converts the identified words into text data for display on the display device as the closed caption.

10. Apparatus according to claim 9, wherein the speech filter, the decoder and the phoneme generator are configured to operate in parallel.

11. Apparatus according to claim 9, wherein the phoneme generator includes a speaker independent speech recognition system.

12. A computer readable carrier including computer program instructions tangibly embodied thereon that cause a computer to implement a method for displaying text information corresponding to a speech portion of audio signals of television program signals as a closed caption on an video display device, the method comprising the steps of:

decoding the audio signals of the television program;

filtering the audio signals by using a spectral subtraction method to extract the speech portion;

parsing the speech portion into discrete speech components in accordance with a speech model and grouping the parsed speech components employing a speaker dependent model to provide phonemes as the parsed speech components wherein the speaker dependent model employs a hidden Markov model;

receiving a training text as a part of the television signal, the training text corresponding to a part of the speech portion of the audio signals:

updating the hidden Markov model based on the training text and the part of the speech portion of the audio signals corresponding to the training text;

applying the updated hidden Markov model to parse the speech portion of the audio signals to provide the phonemes;

identifying words in a database corresponding to the grouped speech components; and converting the identified words into text data for display on the display device as the closed caption.

13. A computer readable carrier according to claim 12, wherein the computer program instructions that cause the computer to perform the step of filtering the audio signals are configured to control the computer concurrently with the computer program instructions that cause the computer to perform the step of decoding the audio signals of the television program and with the computer program instructions that cause the computer to perform the step of parsing the speech signals of the television program.

14. A computer readable carrier according to claim 12 further including computer program instructions that cause the computer to format the text data into lines of text data for display in a closed caption area of the display device.

* * * * *